United States Patent [19]

Okutsu

[11] Patent Number: 4,787,001
[45] Date of Patent: Nov. 22, 1988

[54] MAGNETIC DISC APPARATUS

[75] Inventor: Naohiro Okutsu, Kamakura, Japan

[73] Assignee: Mitsubishi Denki Kabushiki Kaisha, Japan

[21] Appl. No.: 61,972

[22] Filed: Jun. 15, 1987

[30] Foreign Application Priority Data

Jun. 20, 1986 [JP] Japan .................. 61-144039

[51] Int. Cl.⁴ ............................................. G11B 5/55
[52] U.S. Cl. .................................................. 360/106
[58] Field of Search .................. 360/106, 104–105

[56] References Cited

U.S. PATENT DOCUMENTS 4,307,425 12/1981 Kaneko et al. ................ 360/98
4,544,973 10/1985 DeBull ........................... 360/106
4,686,595 8/1987 Bryer ............................. 360/106

FOREIGN PATENT DOCUMENTS 61-51678 5/1985 Japan .

OTHER PUBLICATIONS

"M2361A Mini-Disk Drives", CE Manual, Fujitsu Limited, 6/85.

Primary Examiner—A. J. Heinz
Attorney, Agent, or Firm—Leydig, Voit & Mayer

[57] ABSTRACT

A magnetic disc apparatus including a magnetic recording disc having at least two tracks formed thereon and a magnetic head assembly comprising a rotary shaft, an actuator arm connected to said rotary shaft, suspension arms mounted on the actuator arm and magnetic heads, each of which is mounted on one end of a corresponding suspension arm for magnetic recording and reproducing on the disc, the suspension arms being mounted on one end of the actuator arm in the longitudinal direction thereof, and the mounting distance and angle of one of the suspension arms relative to the other are determined on the basis of the thermal coefficient of the material of the disc, and the thermal coefficient of the material and the length of the actuator arm and the suspension arms, whereby the distance between the head and that between the tracks vary at substantially the same rate as a function of changes in temperature, so that no positional separation of the heads with respect to the tracks occurs. Thus, the materials of the disc, the actuator arm and the suspension arms are freely selected, resulting in a low cost magnetic disc apparatus having high reliability.

3 Claims, 2 Drawing Sheets

4,787,001

MAGNETIC DISC APPARATUS

BACKGROUND OF THE INVENTION

This invention relates to a magnetic disc apparatus and, more particularly, to a magnetic disc apparatus including a plurality of magnetic recording heads for magnetic recording and reproducing on a plurality of tracks formed on the magnetic disc.

FIG. 1 illustrates an example of a conventional magnetic disc apparatus which is disclosed in U.S. Pat. No. 4,307,425.

The conventional magnetic disc apparatus comprises a magnetic disc drive assembly 20 mounted on a base (not shown) and a magnetic head supporting assembly 30 disposed on the base in a predetermined positional relationship with respect to the magnetic disc drive assembly 20.

The magnetic disc drive assembly 20 comprises a rotary shaft 21 for supporting a magnetic disc 23 and a motor 22 for rotatably driving the rotary shaft 21.

The magnetic head supporting assembly 30 comprises a rotary actuator 31 including a rotary shaft 32 which is pivotably mounted on the actuator 31 and an actuator arm 33 which is secured to the rotary shaft 32. The actuator arm 33 has a pair of mounting members 34, each extending from one end of the actuator arm 33. The head supporting assembly 30 further comprises a pair of suspension arms 35, each inwardly extending from one side of the mounting member 34 of the actuator arm 33. Each suspension arm 35 resiliently supports at the extending end thereof a magnetic head 36a or 36b by which magnetic recording and reproducing are achieved on the disc 23. The actuator arm 33 is swingably driven about the rotary shaft 32 by the rotary actuator 31 to move the suspension arms 35 in parallel with the disc surface thereby positioning each of the magnetic heads 36a and 36b at a desired position over the magnetic disc 23.

Now, the disc 23 has coaxial outer and inner tracks T1 and T2 formed on the surface thereof and data is stored on these tracks. Accordingly, the magnetic head 36a accesses the outer track T1 and the magnetic head 36b accesses the inner track T2. When mounting the magnetic heads 36a and 36b in a predetermined positional relationship relative to the tracks, for instance, the head 36a is first moved to an accurate position relative to the outer track T1 and on the basis of the accurate position of the head 36a, the head 36b is adjusted to a position relative to the inner track T2.

Accordingly, only the outer track T1 has tracking servo-information stored thereon and on the basis of the servo-position for the head 36a, i.e. reference moving position, the head 36b is adjusted to a position relative to the inner track T2.

The mounting angle of each of the magnetic heads 36a and 36b is determined in such a manner that the deviation angle of the heads 36a and 36b is smallest with respect to the respective tracks formed in the radial direction of the disc 23, when the actuator arm 33 is swung.

The thus-constructed conventional disc apparatus has problems in that the length of the suspension arms 35 is limited in comparison to the fact that the actuator arm 33 can be made longer, and it becomes difficult to mount a magnetic head lifting mechanism or the like for each of the suspension arms, whereby restrictions in the layout of the components arise. If a plurality of magnetic heads are provided on the actuator arm for accelerating the access time, the distance between one head which is used as a reference and the other head disposed at a predetermined distance with respect to the reference head varies as a function of changes in temperature and the distance between the tracks on the disc surface also varies as a function of changes in temperature. In order to make these varying distances as identical as possible to each other, the disc and the magnetic heads must be made of a material having the same coefficient of expansion, such as aluminium, resulting in a high cost apparatus.

SUMMARY OF THE INVENTION

Accordingly, an object of this invention is to provide a magnetic disc apparatus free from the above discussed problems.

Another object of this invention is to provide a magnetic disc apparatus in which if the distance between a plurality of magnetic heads varies as a function of temperature changes, the distance between the respective tracks on the disc vary at substantially the same rate with respect to the heads' positions regardless of the material used.

Still another object of this invention is to provide a low cost apparatus in comparison to the conventional magnetic disc apparatus.

A magnetic disc apparatus according to this invention including a magnetic recording disc having at least two tracks formed thereon, a magnetic head assembly comprising a rotary shaft, an actuator arm connected to the rotary shaft, suspension arms mounted to the extending end of the actuator arm and magnetic heads mounted on the respective extending ends of the suspension arms for magnetic recording and reproducing of data stored in the disc. The suspension arms are mounted on one end of the actuator arm in the longitudinal direction thereof. The mounting distance and angle of one of the suspension arms relative to the other are determined on the basis of the thermal coefficient of the disc, and the thermal coefficient of the material, and length of the actuator arm and the suspension arms, whereby the distance between the magnetic heads and that between the tracks varies at substantially the same rate as a function of the temperature change, so that no positional separation of the heads with respect to said tracks occurs.

The mounting distance and angle of one of the suspension arms relative to the other are determined in such a manner that the distance between the magnetic heads and that of the tracks vary at substantially the same rate as a function of the temperature changes. Therefore, even if the amount of linear expansion or linear contraction of the actuator arm and the suspension arms supporting the magnetic heads is different from that of the tracks on the disc due to the difference in the materials constituting these components, whereby no positional separation of the heads with respect to the tracks occurs, resulting in an excellent trackability of the magnetic heads.

BRIEF DESCRIPTION OF THE DRAWINGS

This invention will become more readily apparent from the following detailed description of the preferred embodiment of this invention taken in conjunction with the accompanying drawings, in which.

DETAILED DESCRIPTION OF THE PREFERRED EMBODIMENT

Figure 1:
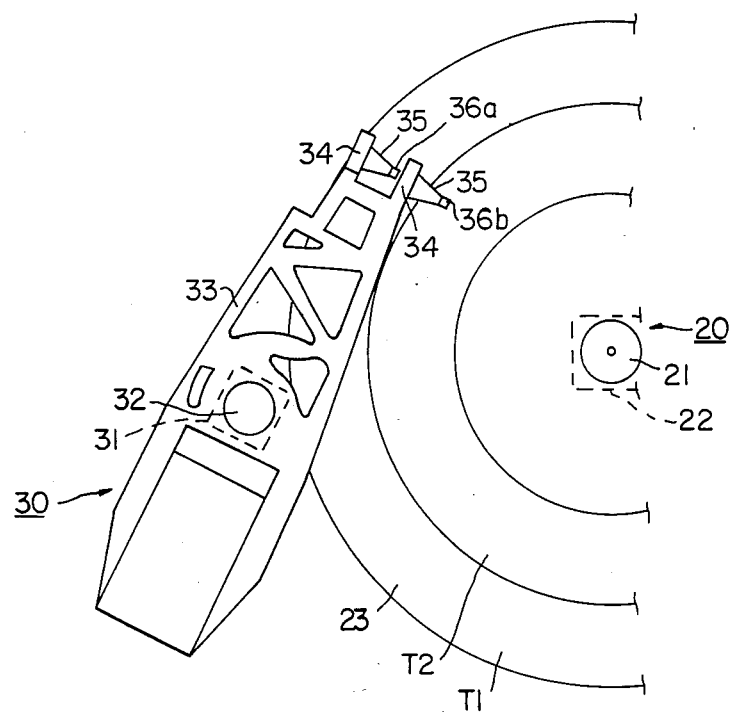
FIG. 1 is a schematic plan view of a conventional magnetic disc apparatus.
Figure 2:
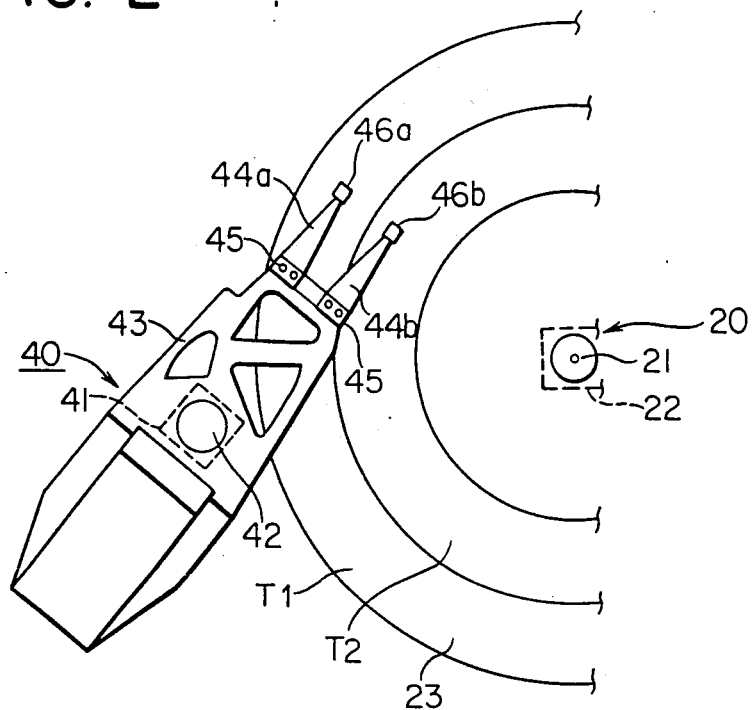
FIG. 2 is a schematic plan view of a magnetic disc apparatus according to an embodiment of this invention.

Referring to FIG. 2, the magnetic disc apparatus according to this invention is substantially similar to the magnetic disc apparatus illustrated in FIG. 1, except for the configuration of suspension arms.

The magnetic head assembly 40 comprises a rotary actuator 41 including a rotary shaft 42 which is pivotably mounted on the actuator 41 and an actuator arm 43 which is secured to the rotary shaft 42 for swinging in parallel with the disc surface. The actuator arm 43 has mounted thereon a pair of suspension arms 44a and 44b by means of a conventional mounting device, such as screws 45. Each of the suspension arm 44a and 44b extends in the longitudinal direction of the actuator arm 43, namely generally tangentially to the tracks T1 and T2 on the disc 23. The suspension arms 44a and 44b each has a magnetic head 46a and 46b respectively mounted at a corresponding extending end thereof. The heads 46a and 46b are moved in a direction parallel to the disc surface and in the radial direction thereof for magnetic recording and reproducing of the data stored on the disc surface.

Figure 3:
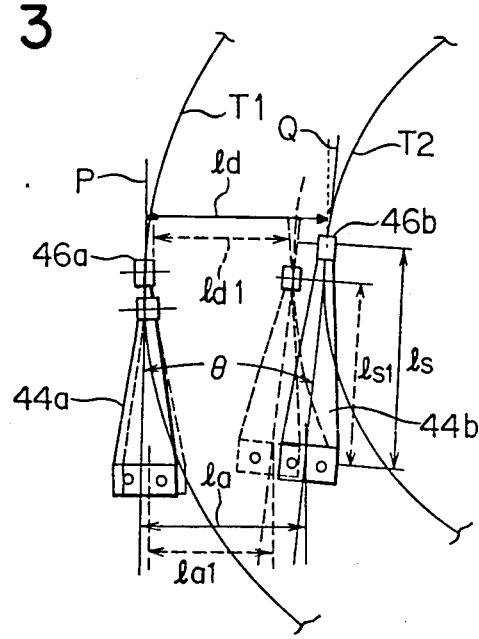
FIG. 3 is an enlarged schematic plan view of a part of the magnetic disc apparatus.

Now, referring to FIG. 3, the magnetic head 46a accesses the outer track T1 and the magnetic head 46b accesses the inner track T2 for reading from and writing data on the disc surface.

The suspension arm 44a has a longitudinal central line P and the suspension arm 44b has a longitudinal central line Q. The longitudinal central line P is disposed at an angle $\theta$ with respect to the longitudinal central line Q.

The servo-position of the respective heads 46a and 46b relative to the tracks T1 and T2 is determined on the basis of the outer head 46a and accordingly the tracking servo-information is stored only for the outer track T1.

Thus, the tracking of the inner head 46b relative to the inner track T2 is compulsorily achieved by following the outer head 46a. The distance between the track T1 and the track T2 as well as the distance between the respective heads 46a and 46b can vary as a function of changes in tempetrature in the environment where the magnetic disc assembly is installed. However, the mounting angle $\theta$ of the head 46a relative to the head 46b is predetermined such that the varying distance between the head 46a and 46b varies in relation to the varying distance between the tracks T1 and T2, regardless of the thermal coefficient of expansion of the different materials of which the disc 23, the actuator arm 43 and the suspension arms 44a and 44b are made.

In general, the disc is made of substantially pure aluminium and the thermal coefficient of linear expansion thereof is obtained by the following equation:

$$Kd = 24 \times 10^{-6} /°C. \text{ (at normal temperature)}$$

The suspension arms 44a and 44b are made of stainless steel whose thermal coefficient of linear expansion is obtained by the following equation:

$$Ks = 17 \times 10^{-6} /°C.$$

The actuator arm 43 is made of aluminium cast or magnesium cast and the respective thermal coefficients of linear expansion which are:

$$Ka = 21 \times 10^{-6} /°C. \text{ (aluminium)}$$

$$Ka = 27 \times 10^{-6} /°C. \text{ (magnesium)}$$

Now, assuming the case where the actuator arm 43 is made of magnesium, the mounting distance between the heads 46a and 46b and that between the tracks T1 and T2 are represented by ld, the mounting distance between the suspension arms 44a and 44b mounted on the actuator 43 on the basis of the longitudinal central line P of the arm 44a and the longitudinal central line Q of the arm 44b by la, the length of the suspension arms 44a and 44b by ls.

When the temperature of the environment where the apparatus is installed is decreased to t°C., the dimensions of each component is decreased as follows:

$$ld \rightarrow ld1, \ la \rightarrow la1, \ ls \rightarrow ls1,$$

The distance between the tracks T1 and T2 is decreased as the disc contracts. When the distance between the tracks T1 and T2 is decreased to ld1, the distance between the heads 46a and 46b is also decreased at the same contraction rate as those of the disc, resulting in no positional separation of the heads 46a and 46b relative to the tracks T1 and T2.

In FIG. 3, the following equation can be obtained:

$$ld = la + ls \sin \theta \tag{1}$$

This equation indicates that the distance between the tracks T1 and T2 is equal to that between the heads 46a and 46b and that the distance between the heads 46a and 46b is determined in accordance with the material of the actuator arm 43 and the material and the mounting distance of the suspension arms 44a and 44b. Differentiating the equation (1) with respect to the temperature t, the following equation is derived:

$$(ld)' = (la)' + (ls \sin \theta)' \tag{2}$$

When the disc is made of aluminium, the amount of change in the tracks formed on the disc surface due to temperature change is as follows $$(ld)' = Kd \ ld \ t \tag{3}$$

When the actuator arm 43 is made of magnesium, the amount of change in the mounting distance between the suspension arms 44a, 44b as a function of changes in temperature is obtained by the following equation:

$$(la)' = Ka \ la \ t \tag{4}$$

When the suspension arms are made of stainless steel, the amount of change in the length thereof is obtained by the following equation:

$$(ls)' = Ks \ ls \ t \tag{5}$$

Substituting equations (3) to (5) into the equation (2), the following equation is obtained:

$$Kd \ ld = Ka \ la + Ks \ ls \ \sin \theta \tag{6}$$

Now, the mounting angle $\theta$ between the suspension arms 44a and 44b and the mounting distance la therebetween are obtained from the equations (1) and (6), as follows:

$$\sin \theta = (Ka - Kd) \, ld / (Ka - Ks) \, ls \quad (7),$$

Accordingly, $$la = (Kd - Ks)/(Ka - Ks) \cdot ld \quad (8)$$

Thus, when the mounting distance ld between the heads 46a and 46b and the length ls of the suspension arms 44a and 44b are theoretically obtained at the reference temperature, the mounting distance la between the the heads 46a and 46b and the mounting angle $\theta$ thereof are determined.

For instance, when ld is 20 mm and ls is 26 mm, $\sin \theta$ is almost equal to 13 degree and la is equal to 14 mm.

Although the materials, of which the disc 23, the actuator arm 43 and the suspension arms 44a and 44b are made, are different from each other, no position separation due to the forced follow type tracking occurs when the temperature changes.

In the above embodiment the coefficients of linear expansion are $Ka > Kd > Ks$. If the actuator arm 43 is made of aluminium cast, the coefficients of linear expansion thereof are $Kd > Ka > Ks$, ld is smaller than la, the angle $\theta$ is negative, the mounting distance between the suspension arms 44a and 44b is decreased at the extending ends thereof and increased at the mounting side thereof.

It should be noted that although the head assembly 40 is provided with two magnetic heads 46a and 46b for recording and reproducing one disc surface in the illustrated embodiment, it is possible to design a magnetic head assembly including two or more heads in which the positional separation of the heads relative to the tracks is minimal.

As can be seen from the above description, according to this invention, the amount of change of the distance between the tracks on the disc surface as a function of the temperature changes is changeable at the same rate as that of the distance between the heads. The materials of the disc, the actuator arm and the suspension arm can be freely selected, resulting in a low cost magnetic disc apparatus having high reliability.

What is claimed is:

1. A magnetic disc apparatus including a magnetic recording disc having at least two tracks formed thereon and a magnetic head assembly comprising a rotary shaft, an actuator arm connected to said rotary shaft, said actuator arm having a longitudinal axis intersecting the center of said rotary shaft, elongated suspension arms mounted on said actuator arm and magnetic heads, each of which is mounted on one end of said suspension arms, respectively, for magnetic recording and reproducing on said disc, one of said suspension arms comprising a reference suspension arm being mounted on one end of said actuator arm and extending parallel to the axis of said actuator arm, and one of said suspension arms being mounted on the one end of said actuator arm at a mounting distance from and extending at an acute mounting angle relative to said reference suspension arm, said suspension arms having equal length and being made of the same material, and at least one of said actuator arm, and said magnetic disc being made of different material, whereby the distance between said heads and that between said tracks varies at substantially the same rate as a function of changes in temperature so that no positional separation of said magnetic heads with respect to said tracks occurs.

2. A magnetic disc apparatus according to claim 1 in which the mounting distance and angle are determined according to the following equations:

$$\theta = \sin^{-1}(Ka - Kd) \, ld / (Ka - Ks) ls$$

$$la = Kd - Ks/Ka - Ks \, ld$$

where

Ka, Kd, and Ks are thermal expansion coefficients of the materials of said actuator arm, said magnetic recording disc, and said suspensions arms, respectively, ld is the distance between the magnetic head mounted on said reference suspension arm and the magnetic head mounted on said one suspension arm, and ls is the length of said suspension arms.

3. In a magnetic disc apparatus including a magnetic recording disc having at least two tracks formed thereon and a magnetic head assembly comprising a rotary shaft, an actuator arm connected to said rotary shaft, said actuator arm having a longitudinal axis intersecting the center of said rotary shaft, elongated suspension arms mounted on said actuator arm and magnetic heads, each of which is mounted on one end of said suspension arms, respectively, for magnetic recording and reproducing on said disc, one of said suspension arms comprising a reference suspension arm mounted on one end of said actuator arm and extending parallel to the axis of said actuator arm, and one of said suspension arms being mounted on the one end of said actuator arm at a mounting distance from and extending at an acute mounting angle relative to said reference suspension arm, said suspension arms having equal length and being made of the same material, and at least one of said actuator arm and said magnetic disc being made of a different material, the method of determining the mounting distance and angle by applying the following equations:

$$\theta = \sin^{-1}(Ka - Kd) \, ld/(Ka - Ks)ls$$

$$la = Kd - Ks/Ka - Ks \, ld$$

where

Ka, Kd, and Ks are thermal expansion coefficients of the materials of said actuator arm, said magnetic recording disc, and said suspensions arms, respectively, ld is the distance between the magnetic head mounted on said reference suspension arm and the magnetic head mounted on said one suspension arm, and ls is the length of said suspension arms.

* * * * *